(12) United States Patent
Stahr et al.

(10) Patent No.: US 10,953,860 B2
(45) Date of Patent: Mar. 23, 2021

(54) SOLENOID VALVE AND HYDRAULIC BRAKING SYSTEM FOR A VEHICLE

(71) Applicant: Robert Bosch GmbH, Stuttgart (DE)

(72) Inventors: Wolf Stahr, Abstatt (DE); Pascal Godbillon, Heilbronn (DE); Massimiliano Ambrosi, Abstatt (DE); Michael Eisenlauer, Affalterbach (DE); Edgar Kurz, Heilbronn-Horkheim (DE); Dietmar Kratzer, Tamm (DE)

(73) Assignee: Robert Bosch GmbH, Stuttgart (DE)

( * ) Notice: Subject to any disclaimer, the term of this patent is extended or adjusted under 35 U.S.C. 154(b) by 10 days.

(21) Appl. No.: 16/332,313

(22) PCT Filed: Sep. 20, 2017

(86) PCT No.: PCT/EP2017/073738
§ 371 (c)(1),
(2) Date: Mar. 11, 2019

(87) PCT Pub. No.: WO2018/069010
PCT Pub. Date: Apr. 19, 2018

(65) Prior Publication Data
US 2019/0217840 A1    Jul. 18, 2019

(30) Foreign Application Priority Data

Oct. 13, 2016    (DE) .................... 10 2016 219 994.3

(51) Int. Cl.
*B60T 13/68*    (2006.01)
*B60T 8/36*    (2006.01)
(Continued)

(52) U.S. Cl.
CPC ............ *B60T 13/686* (2013.01); *B60T 8/363* (2013.01); *F16K 31/0655* (2013.01); *H01F 7/16* (2013.01)

(58) Field of Classification Search
CPC .... B60T 13/686; B60T 8/363; F16K 31/0655; H01F 7/16
See application file for complete search history.

(56) References Cited

U.S. PATENT DOCUMENTS

| 5,573,224 A | 11/1996 | Kim | |
|---|---|---|---|
| 5,735,582 A | * 4/1998 | Eith | ........................ B60T 8/363 |
| | | | 137/596.17 |

(Continued)

FOREIGN PATENT DOCUMENTS

| DE | 10 2004 048 861 A1 | 4/2006 |
|---|---|---|
| DE | 10 2006 004 286 A1 | 8/2007 |

(Continued)

OTHER PUBLICATIONS

International Search Report corresponding to PCT Application No. PCT/EP2017/073738, dated Dec. 18, 2017 (German and English language document) (5 pages).

*Primary Examiner* — Melody M Burch
(74) *Attorney, Agent, or Firm* — Maginot, Moore & Beck LLP

(57) ABSTRACT

In a solenoid valve for a hydraulic braking system, a mechanical locking device is formed between a guide assembly and a valve armature or tappet. The mechanical locking device releases the valve armature or the tappet in a currentless closed position such that the restoring spring drives the valve armature and presses the closing element into the valve seat to seal and fastens the valve armature or the tappet in a currentless open position against the force of the restoring spring in an axial locking position such that the closing element lifts from the valve seat. The valve armature includes a main-stage armature having a first surface to which pressure is applied and a preliminary-stage armature having a smaller, second surface to which pressure is applied. The preliminary-stage armature is mounted axially (Continued)

movably in the main-stage armature and interacts with a preliminary-stage seat by means of a preliminary-stage closing element.

14 Claims, 7 Drawing Sheets

(51) Int. Cl.
  *F16K 31/06* (2006.01)
  *H01F 7/16* (2006.01)
  *B60T 13/00* (2006.01)

(56) References Cited

U.S. PATENT DOCUMENTS

| | | | |
|---|---|---|---|
| 5,865,213 A | 2/1999 | Scheffel et al. | |
| 2008/0093573 A1* | 4/2008 | Acar | B60T 8/363 |
| | | | 251/129.15 |
| 2010/0284841 A1* | 11/2010 | Jahn | F04B 53/146 |
| | | | 417/549 |
| 2012/0248357 A1* | 10/2012 | Jeon | B60T 8/363 |
| | | | 251/129.15 |
| 2012/0326065 A1* | 12/2012 | Ferguson | F16K 27/029 |
| | | | 251/129.15 |
| 2013/0207016 A1* | 8/2013 | Schubitschew | F16K 31/02 |
| | | | 251/129.15 |
| 2019/0248353 A1* | 8/2019 | Kratzer | B60T 8/32 |

FOREIGN PATENT DOCUMENTS

| | | |
|---|---|---|
| DE | 10 2007 051 557 A1 | 4/2009 |
| DE | 10 2014 003 381 A1 | 9/2015 |
| EP | 0 073 886 B1 | 3/1983 |
| JP | S61-84484 A | 4/1986 |
| JP | H10-507720 A | 7/1998 |
| KR | 2001 004 6079 A | 6/2001 |

* cited by examiner

SOLENOID VALVE AND HYDRAULIC BRAKING SYSTEM FOR A VEHICLE

This application is a 35 U.S.C. § 371 National Stage Application of PCT/EP2017/073738, filed on Sep. 20, 2017, which claims the benefit of priority to Serial No. DE 10 2016 219 994.3, filed on Oct. 13, 2016 in Germany, the disclosures of which are incorporated herein by reference in their entirety.

The disclosure proceeds from a solenoid valve for a hydraulic brake system according to the generic type disclosed herein. The present disclosure also relates to a hydraulic brake system for a vehicle having a solenoid valve of said type.

BACKGROUND

The prior art has disclosed hydraulic brake systems for vehicles having a master brake cylinder, having a hydraulics unit and having multiple wheel brakes, which comprise various safety systems such as for example an anti-lock system (ABS), electronic stability program (ESP) etc., and which can perform various safety functions such as for example an anti-lock function, drive slip control (ASR) etc. By means of the hydraulics unit, open-loop and/or closed-loop control processes can be performed in the anti-lock system (ABS) or in the drive slip control system (ASR system) or in the electronic stability program system (ESP system) for the build-up of pressure or dissipation of pressure in the corresponding wheel brakes. To perform the open-loop and/or closed-loop control processes, the hydraulics unit comprises solenoid valves which are normally held in distinct positions owing to the oppositely acting forces "magnetic force", "spring force" and "hydraulic force". Accordingly, the valve types "open when electrically deenergized" and "closed when electrically deenergized" exist. These solenoid valves each comprise a solenoid assembly and a valve cartridge, which comprises a pole core, a guide sleeve connected to the pole core, an armature which is guided within the guide sleeve so as to be axially movable between a closed position and an open position counter to the force of a resetting spring and which has a plunger and has a closing element, and a valve sleeve which is connected to the guide sleeve and which has a valve seat. By means of the electrical energization of the solenoid assembly, a magnetic force is generated which, in the case of a solenoid valve which is open when electrically deenergized, moves the armature with the plunger and the closing element from the open position into the closed position, until the closing element abuts against the corresponding valve seat and seals off the latter. In the electrically deenergized state, the resetting spring moves the armature with the plunger and the closing element, and the closing element lifts off from the valve seat and opens up the latter. In the case of a solenoid valve which is closed when electrically deenergized, the electrical energization of the solenoid assembly causes the armature with the plunger and the closing element to be moved from the closed position into the open position, and the closing element lifts off from the valve seat and opens up the latter. If the electrical current is deactivated, then the resetting spring moves the solenoid armature with the closing element in the direction of the valve seat until the closing element abuts against the valve seat and seals off the latter. This electrical energization is associated with energy consumption, which is undesirable. Furthermore, the functional reliability or functional availability is not provided to the desired extent if the function is realized only by means of active electrical energization.

The laid-open specification DE 10 2007 051 557 A1 describes for example a solenoid valve, which is closed when electrically deenergized, for a slip-controlled hydraulic vehicle brake system. The solenoid valve comprises a hydraulic part, also referred to as valve cartridge, which is arranged partially in a stepped bore of a valve block, and an electrical part, which is formed substantially from a solenoid assembly which is fitted onto that part of the valve cartridge which projects out of the valve block. The solenoid assembly comprises a coil body with an electrical winding, a magnetic-flux-conducting coil casing, and a magnetic-flux-conducting ring-shaped disk. The hydraulic part has a guide sleeve, which at its end facing toward the electrical part is closed off by means of a pressed-in pole core which is welded in fluid-tight fashion. In the guide sleeve, there is received a longitudinally displaceable armature which is supported by means of a restoring spring on the pole core. The armature has, averted from the pole core, a spherical closing body which is arranged in a depression. At the end averted from the pole core, a pot-shaped valve sleeve with a cylindrical shell and a base is pressed into the guide sleeve. The valve sleeve has, on the base, a passage and a hollow conical valve seat which, with the closing body, forms a seat valve. By means of the seat valve, a fluidic connection between the passage on the base of the valve sleeve and at least one passage in the casing of the valve sleeve is configured to be switchable. Furthermore, on the outside of the shell of the valve sleeve, there is arranged a radial filter for filtering dirt particles out of the fluid flow. The guide sleeve may be calked in the stepped bore of the valve block by means of a fastening bushing.

EP 0 073 886 B1 has disclosed a hydraulic control unit with a control slide which is displaceable axially into multiple switching positions and which automatically returns into one of its switching positions by means of a resetting spring, which control slide, outside said switching position, can be fixed by means of a spring-loaded detent which engages into detent positions, which detent is furthermore hydraulically actuatable by means of a part which is guided as a piston in a housing bore and which can be acted on via an adjoining ring-shaped chamber with pressurized fluid. The ring-shaped chamber is connected via a pilot control valve to the pump pressure line that leads to the consumer, which pump pressure line is relieved of pressure when the one or more consumers are deactivated. Here, the hydraulic actuating travel of the detent is limited in relation to its actuating travel that is possible counter to spring force, and the detent locations on the control slide for the detent to engage into or behind are dimensioned radially such that, irrespective of the actuating travel that is possible counter to spring force, a hydraulic release of the detent is possible only at the detent positions provided for this.

SUMMARY

The solenoid valve for a hydraulic brake system having the features disclosed herein has the advantage that, in a solenoid valve with an electrically deenergized first operating state, a further electrically deenergized second operating state can be implemented. This means that embodiments of the present disclosure provide a bistable solenoid valve which can be switched between the two operating states as a result of application of a switching signal, wherein the solenoid valve remains permanently in the respective operating state until the next switching signal. Here, the first operating state may correspond to a closed position of the solenoid valve, and the second operating state may correspond to an open position of the solenoid valve. The switch between the two operating states may be performed for example by means of brief electrical energization of the active actuator of the solenoid assembly or by means of application of a switching signal or electrical current pulse to the solenoid assembly. With such a short electrical energization, the energy consumption can be advantageously reduced in relation to a conventional solenoid valve with two operating states, which has only one electrically deenergized first operating state and which, in order to implement the electrically energized second operating state, must be electrically energized for the duration of the second operating state. Furthermore, by contrast to embodiments of the present disclosure, the functional reliability or functional availability is not provided to the desired extent if the function can be realized only by means of active electrical energization.

Since the throughflow when the valve is open must be great enough that the conventional ESP functions and/or ABS functions and/or ASR functions of the hydraulic brake system are not impeded, this leads to a relatively large sealing diameter of the valve seat, that is to say to a large pressure-loaded surface. Therefore, a high magnetic force is required to open the bistable solenoid valve which is under pressure. The force required for opening the solenoid valve which is under pressure is advantageously considerably reduced by means of the introduction of the two-part valve armature with plunger stage action, and the available magnetic force is greatly increased. The pressure enclosed in the wheel brake acts with a seat closing action, that is to say the pressure presses the closing element into the valve seat. Since, for system reasons, high demands are placed on the leak-tightness of the bistable solenoid valve, an additional sealing element may be provided on the closing element, which additional sealing element is designed for example as an O-ring seal.

Embodiments of the present disclosure provide a solenoid valve for a hydraulic brake system, having a solenoid assembly, having a pole core, having a guide sleeve connected to the pole core, having a valve armature which is guided in axially movable fashion within the guide sleeve and which can be driven counter to the force of a resetting spring by a magnet force generated by the solenoid assembly or can be driven by the force of the resetting spring and which axially moves a plunger with a closing element, and having a valve body which is connected to the guide sleeve and which has a valve seat which is arranged between at least one first flow opening and at least one second flow opening. Here, the valve armature or the plunger is guided axially in at least one passage opening of a guide assembly, wherein a mechanical detent device is formed between the guide assembly and the valve armature or the plunger, which mechanical detent device, in an electrically deenergized closed position, releases the valve armature or the plunger such that the resetting spring drives the valve armature and pushes the closing element sealingly into the valve seat in order to perform a sealing function, and, in an electrically deenergized open position, fixes the valve armature or the plunger, counter to the force of the resetting spring, in an axial detent position such that the closing element is lifted off from the valve seat. Futhermore, the valve armature comprises a main stage armature with a first pressure-loaded surface and comprises a pilot stage armature with a smaller second pressure-loaded surface, which pilot stage armature is mounted in axially movable fashion in the main stage armature and interacts via a pilot stage closing element with a pilot stage seat. In the electrically deenergized closed position, the fluid flow between the at least one first flow opening and the at least one second flow opening is shut off, and in the electrically deenergized open position, the fluid flow between the at least one first flow opening and the at least one second flow opening is permitted.

Embodiments of the solenoid valve according to the disclosure advantageously exhibit very low leakage in the closed position and low energy consumption in the open position.

The hydraulic brake system for a vehicle having the features disclosed herein has the advantage that, with little additional outlay, it is possible in a commonly provided hydraulics unit with ESP functionality to realize an additional function which can electrohydraulically enclose a present brake pressure in the corresponding wheel brake and hold this over a relatively long period of time with little energy requirement. This means that the existing pressure supply, the pipelines from the hydraulics unit to the wheel brakes and sensor and communication signals can be used not only for the ESP function and/or ABS function and/or ASR function but also for an electrohydraulic pressure-holding function in the wheel brakes. In this way, it is advantageously possible for costs, structural space, weight and cabling to be saved, with the positive effect that the complexity of the brake system is reduced.

Advantageous improvements of the solenoid valve for a hydraulic brake system as specified herein are possible by means of the measures and refinements detailed in the disclosure.

It is particularly advantageous that the valve body may have a receiving region which may at least partially receive the guide assembly. Here, the guide assembly may be mounted in rotationally movable or rotationally fixed fashion in the receiving region of the valve body. The mechanical detent device may preferably be designed as a rotary cam mechanism which utilizes a circumferential force component in order to vary a rotational position between the valve armature or the plunger with closing element and the guide assembly and in order to move the valve armature or the plunger with closing element axially into the detent position and out of said detent position again, such that the valve armature or the plunger with the closing element can easily switch between the two electrically deenergized positions as a result of application of a switching signal or electrical current pulse to the solenoid assembly. Proceeding from the electrically deenergized closed position, the valve armature or the plunger with the closing element can switch from the electrically deenergized closed position into the electrically deenergized open position as a result of application of a switching signal. When a subsequent switching signal is applied, the valve armature or the plunger with the closing element switches back from the electrically deenergized open position into the electrically deenergized closed position. Proceeding from the electrically deenergized open position, the valve armature or the plunger with the closing element can switch from the electrically deenergized open position into the electrically deenergized closed position as a result of application of a switching signal. When a subsequent switching signal is applied, the valve armature or the plunger with the closing element switches back from the electrically deenergized closed position into the electrically deenergized open position. Depending on the friction to be overcome, the guide assembly may rotate relative to the valve armature or plunger, and/or the valve armature or the plunger may rotate relative to the arranged guide assembly, during the axial movement of the valve armature or of the plunger. In order to targetedly permit only the movement of one assembly, the guide assembly may be fastened rotationally fixedly in the valve body, or the valve armature may be configured with a rotation prevention facility by means of positive locking with the guide sleeve or with the pole core, or the plunger may be configured with a rotation prevention facility by means of positive locking with the valve armature.

In one advantageous refinement of the solenoid valve, the resetting spring may act between the pilot stage armature and the pole core. Optionally, a main stage spring may move the main stage armature in the direction of the pole core, the spring force of which main stage spring is selected to be lower than the spring force of the resetting spring. The main stage spring raises the main stage armature when the pilot stage armature has already been opened and thus pressure equalization has been established. The air gap in the direction of the pole core, and thus also the required magnetic force, can thus be reduced.

In a further advantageously refinement of the solenoid valve, a main body of the plunger may have a passage opening which fluidically connects the two ends of the main body to one another. Here, the pilot stage seat is arranged at an end facing toward the pole core, and the closing element is arranged at an end facing toward the valve seat. To be able to realize the greatest possible throughflow in the open position, the valve seat has a significantly larger first sealing diameter than the pilot stage seat. This is the case in particular if an additional elastomer seal is used on the closing body in order to achieve good leak-tightness. The above-described pressure enclosed in the wheel brakes prevails throughout the solenoid valve above the main stage sealing diameter. The pilot stage seat at the upper end of the plunger inserted into the main stage armature is attached to the hydraulically unpressurized side via the passage opening in the plunger, which is designed for example as a channel or bore. Since said passage opening serves only for the release of pressure during the opening of the pilot stage, and no great fluid throughflow is required, a second sealing diameter of the pilot stage seat may be designed to be significantly smaller. As a pilot stage closing element, use may for example be made of a ball pressed into the pilot stage armature. The introduction of the pilot stage proposed here duly gives rise to an additional leakage point, but the relatively short sealing line exhibits little susceptibility to leakage. To optimize the sealing action and allow for the varying loads and functions at the plunger, the plunger may be produced as a two-component injection-molded part. Here, the main body of the plunger may be produced for example from carbon-fiber-filled PEEK plastic at the lower end in the region of the closing body for the purposes of accommodating the relatively high axial forces, and may be produced from non-reinforced PEEK plastic of relatively high elasticity at the upper end in the region of the pilot stage seat. Alternatively, the plunger may be produced by powder injection molding (PIM) or ceramic injection molding (CIM) or metal injection molding (MIM) etc. or by 3D printing. Furthermore, the plunger may, at its tip, be formed integrally as a closing element for the valve seat. Alternatively, the plunger may be of multi-part design and have for example an additional sealing element, such as for example an O-ring seal, which is arranged in the region of the closing element and which improves the sealing action in the closed position. The plunger may for example be pressed into a corresponding receptacle in the main body of the valve armature.

In a further advantageous refinement of the solenoid valve, a pressure equalizing groove may be formed between the pilot stage armature and the main stage armature. Said pressure equalizing groove may be incorporated either only into the main stage armature or only into the pilot stage armature or both into the main stage armature and into the pilot stage armature. The pressure equalizing groove permits a pressure equalization between the hydraulics upstream and downstream of the valve seat when only the pilot stage seat is open. That region of the pilot stage armature which is guided in the main armature is designed to be so tall that, even in the case of a maximum relative movement, it is still guided within the associated depression of the main stage armature. This means that the pilot stage armature is guided in the depression of the main stage armature irrespective of the armature stroke. In this way, the magnetic force can be advantageously increased. Furthermore, the pilot stage armature may be magnetically insulated from the main stage armature, for example by means of a coating or an additional component.

In a further advantageous refinement of the solenoid valve, the guide assembly may comprise a control cage, which has a first passage opening and a first guide geometry, and a control ring, which has a second passage opening and a second guide geometry. The control cage and the control ring may for example each be formed as an individual part. Said individual parts may for example be produced as plastics parts in an injection molding process. Alternatively, the plastics parts may be produced by powder injection molding (PIM) or ceramic injection molding (CIM) or metal injection molding (MIM) etc. or by 3D printing. Furthermore, the control ring may be produced as a sheet-metal part in a punching and bending process. By virtue of the guide assembly being of multi-part form as plastics parts, the complex guide geometries can be produced easily and inexpensively as mass-produced parts and subsequently joined together. The control cage and the control ring may be connected rotationally fixedly to one another, wherein the control ring may be inserted into the control cage and at least one positioning lug formed on the control ring may be inserted into a corresponding positioning aperture formed on the control cage. Alternatively, the guide assembly with control cage and control ring may be formed in one piece, for example as a two-component plastics injection-molded part. Furthermore, the valve armature or the plunger may have, on a portion which is guided in the at least one passage opening of the guide assembly, a third guide geometry which interacts with the first guide geometry of the control cage during an axial movement of the valve armature in the direction of the pole core and which interacts with the second guide geometry of the control ring during an axial movement of the valve armature in the direction of the valve seat and which generates a rotational movement of the valve armature or of the plunger and/or of the guide assembly about a common longitudinal axis.

Owing to the requirement for magnetic conductivity, the valve armature is produced from a magnetically conductive material, for example in a cold impacting process or by cutting. The pole core is likewise produced from a magnetically conductive material.

BRIEF DESCRIPTION OF THE DRAWINGS

Exemplary embodiments of the disclosure are illustrated in the drawing and will be discussed in more detail in the following description. In the drawing, the same reference designations denote components or elements which perform identical or analogous functions.

FIG. 1 is a schematic perspective sectional illustration of an exemplary embodiment of a solenoid valve according to the disclosure in its electrically deenergized closed position.

DETAILED DESCRIPTION

Figure 1:
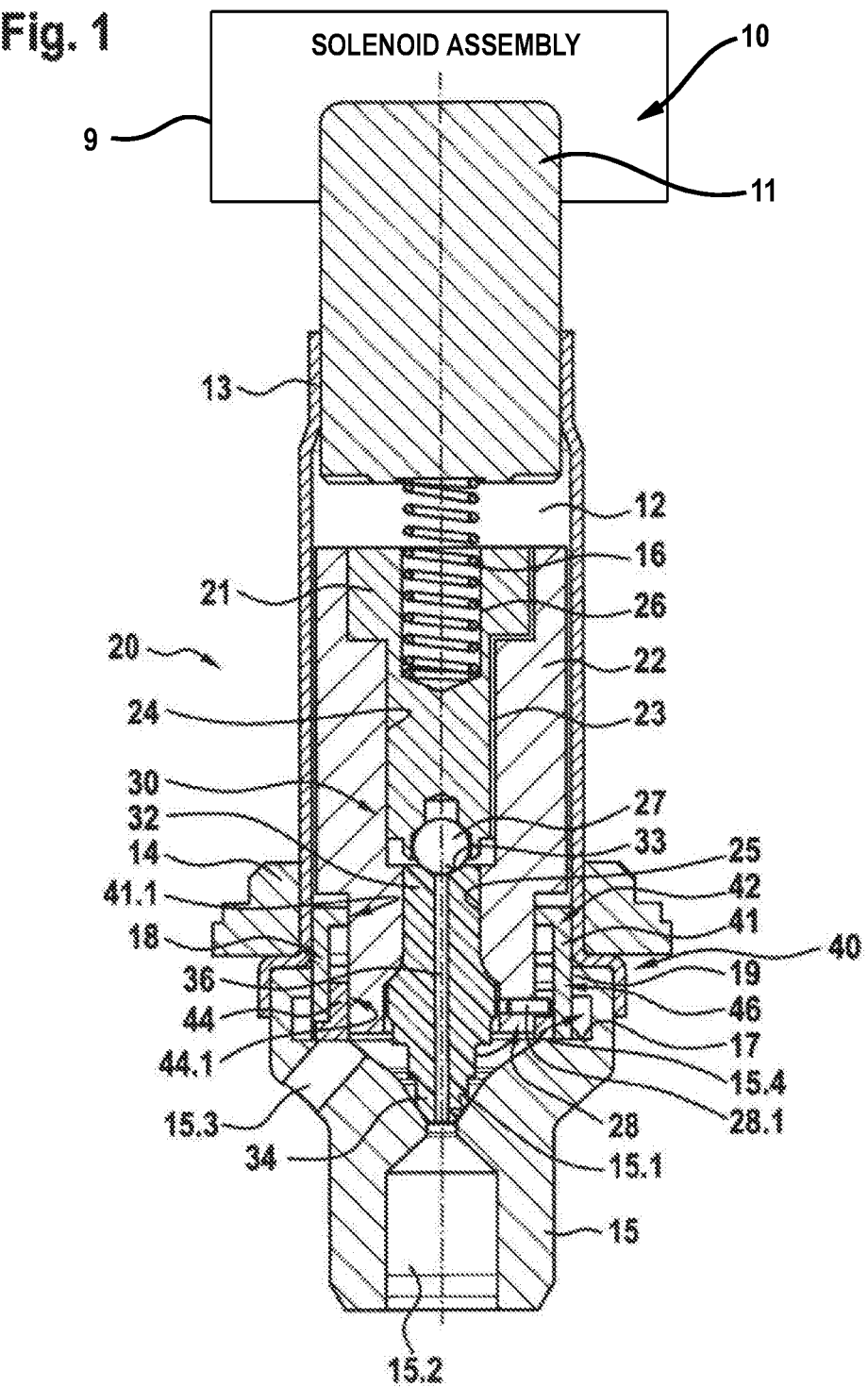
Figure 2:
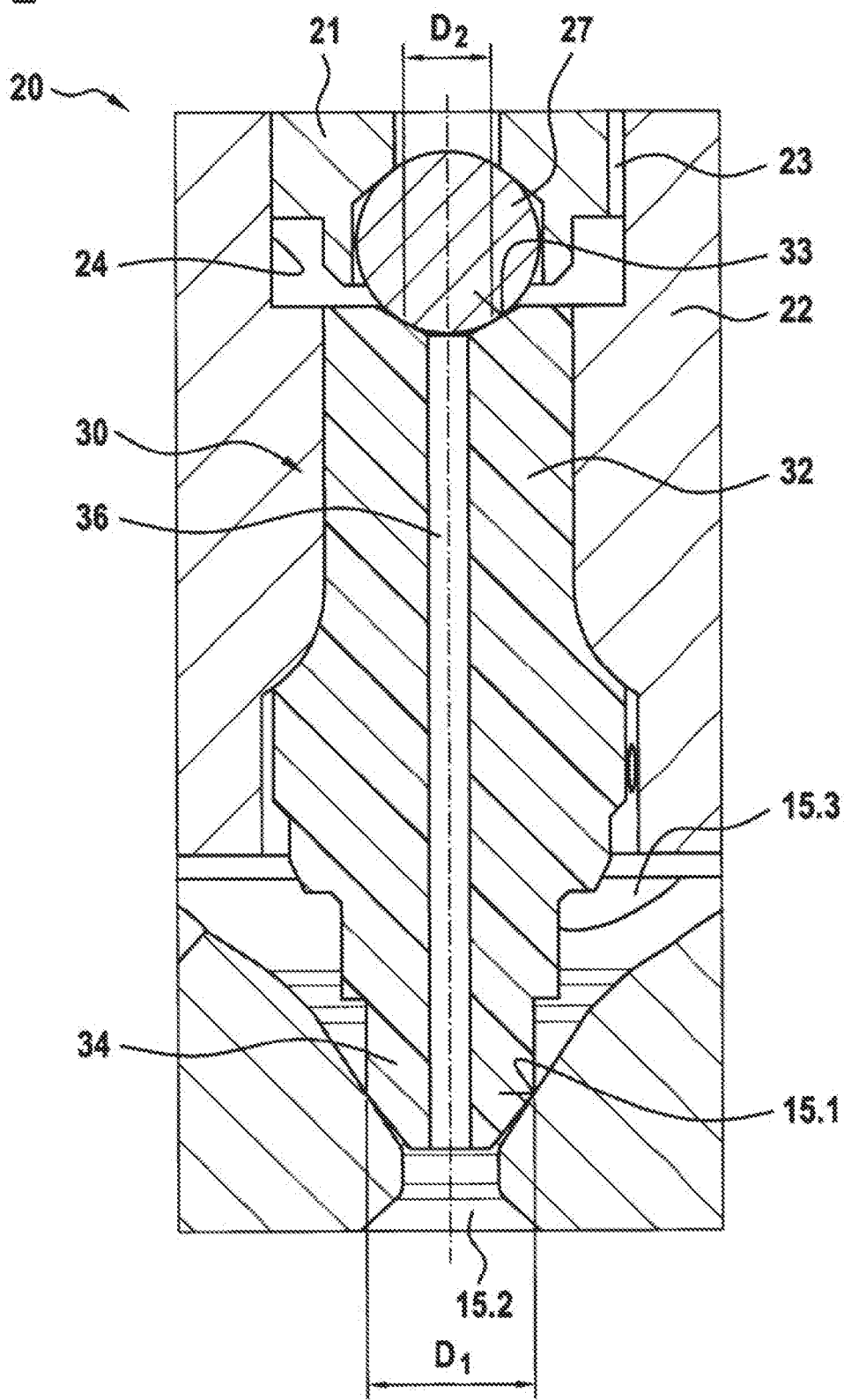
FIG. 2 is a schematic sectional illustration of a detail of the solenoid valve from FIG. 1.
Figure 3:
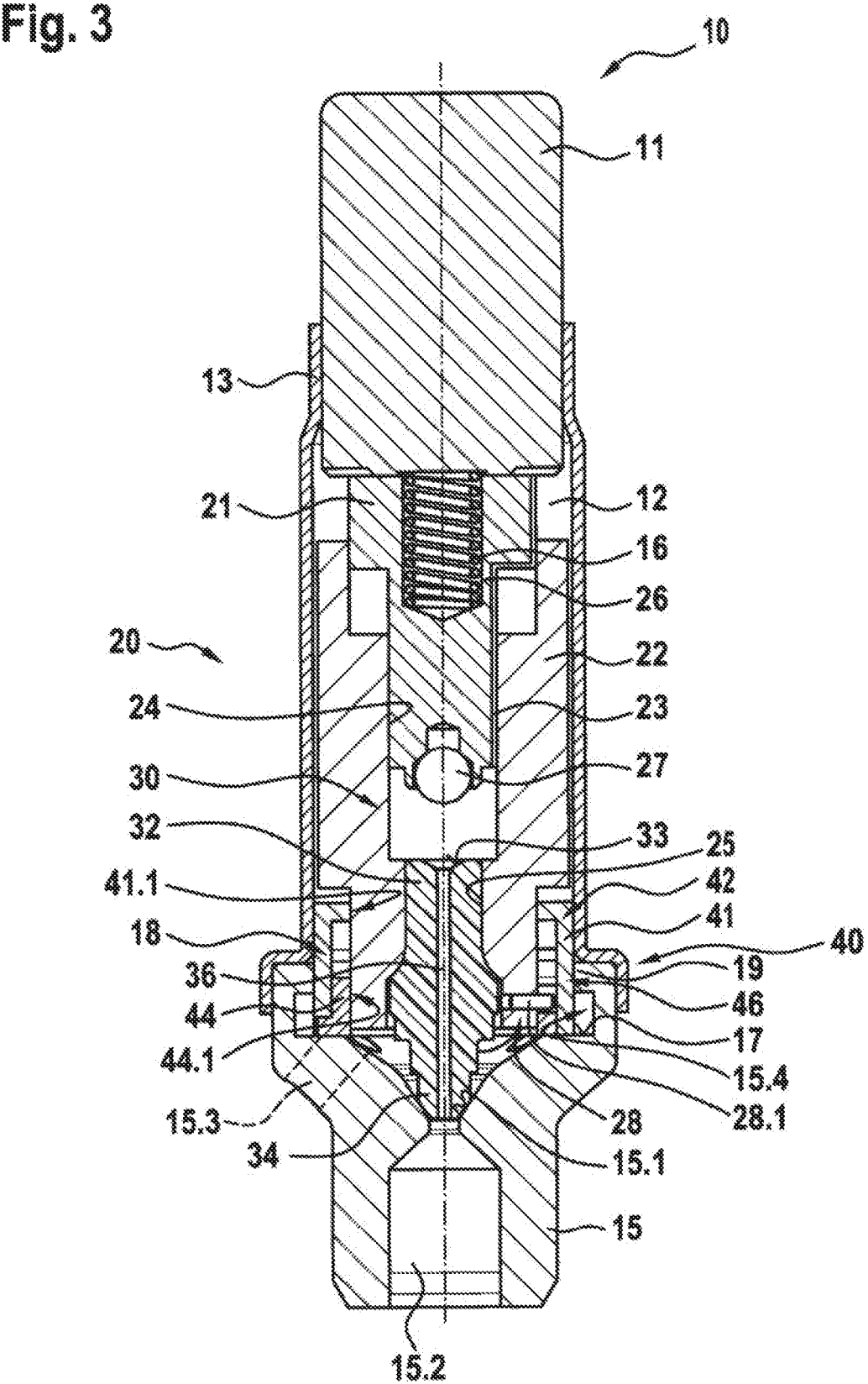
FIG. 3 is a schematic perspective sectional illustration of the solenoid valve from FIG. 1 in the electrically energized state with open pilot stage seat.

As can be seen from FIGS. 1 to 6, the illustrated exemplary embodiments of a solenoid valve 10, 10A according to the disclosure for a hydraulic brake system 1 comprises in each case one solenoid assembly 9 (illustrated symbolically in FIG. 1), a pole core 11, a guide sleeve 13 connected to the pole core 11, a valve armature 20, 20A which is guided in axially movable fashion within the guide sleeve 13 and which can be driven counter to the force of a resetting spring 16 by a magnet force generated by the solenoid assembly or can be driven by the force of the resetting spring 16 and which axially moves a plunger 30 with a closing element 34, and a valve body 15 which is connected to the guide sleeve 13 and which has a valve seat 15.1 which is arranged between at least one first flow opening 15.2 and at least one second flow opening 15.3. Here, the valve armature 20, 20A or the plunger 30 is guided axially in at least one passage opening 41.1, 44.1 of a guide assembly 40. A mechanical detent device 18 is formed between the guide assembly 40 and the valve armature 20, 20A or the plunger 30, which mechanical detent device, in an electrically deenergized closed position, releases the valve armature 20, 20A or the plunger 30 such that the resetting spring 16 drives the valve armature 20, 20A and pushes the closing element 34 sealingly into the valve seat 15.1 in order to perform a sealing function, and, in an electrically deenergized open position, fixes the valve armature 20, 20A or the plunger 30, counter to the force of the resetting spring 16, in an axial detent position such that the closing element 34 is lifted off from the valve seat 15.1. Furthermore, the valve armature 20, 20A comprises a main stage armature 22, 22A with a first pressure-loaded surface and comprises a pilot stage armature 21 with a smaller second pressure-loaded surface, which pilot stage armature is mounted in axially movable fashion in the main stage armature 22, 22A and interacts via a pilot stage closing element 27 with a pilot stage seat 33. In this way, a bistable solenoid valve 10, 10A is implemented which can be switched between the two positions as a result of application of a switching signal, wherein the solenoid valve 10, 10A remains permanently in the respective operating state until the next switching signal.

A bistable solenoid valve 10, 10A of said type may be used for example in a hydraulic brake system 1 for a vehicle.

Figure 7:
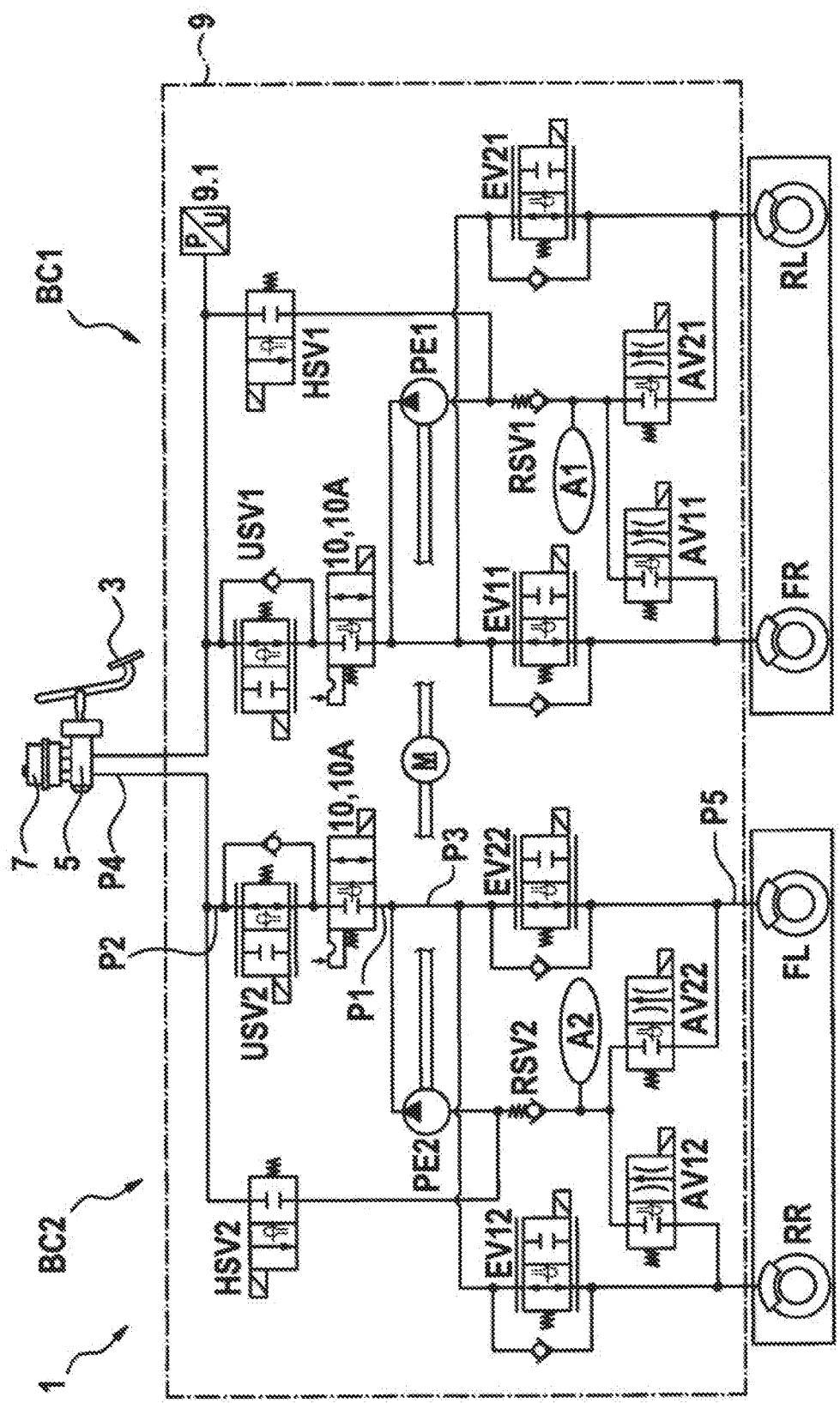
FIG. 7 shows a schematic hydraulic circuit diagram of an exemplary embodiment of a hydraulic brake system according to the disclosure for a vehicle.

As can be seen from FIG. 7, the illustrated exemplary embodiment of a hydraulic brake system 1 according to the disclosure for a vehicle, with which various safety functions can be implemented, comprises a master brake cylinder 5, a hydraulics unit 9 and multiple wheel brakes RR, FL, FR, RL. The hydraulics unit 9 comprises at least two brake circuits BC1, BC2 for brake pressure modulation in the wheel brakes RR, FL, FR, RL. Here, the at least two brake circuits BC1, BC2 each have a bistable solenoid valve 10, 10A which has an electrically deenergized closed position and an electrically deenergized open position and which is switchable between the two positions, wherein the bistable solenoid valve 10, 10A, in the electrically deenergized open position, enables the brake pressure modulation in at least one associated wheel brake RR, FL, FR, RL and, in the electrically deenergized closed position, encloses a present brake pressure in the at least one associated wheel brake RR, FL, FR, RL.

As can also be seen from FIG. 7, the illustrated exemplary embodiment of the hydraulic brake system 1 comprises two brake circuits BC1, BC2, which are assigned in each case two of the four wheel brakes RR, FL, FR, RL. Thus, a first wheel brake FR, which is arranged for example on the right-hand side at a vehicle front axle, and a second wheel brake RL, which is arranged for example at the left-hand side at a vehicle rear axle, are assigned to a first brake circuit BC1. A third wheel brake RR, which is arranged for example at the right-hand side at a vehicle rear axle, and a fourth wheel brake FL, which is arranged for example at the left-hand side at the vehicle front axle, are assigned to a second brake circuit BC2. Each wheel brake RR, FL, FR, RL is assigned an inlet valve EV11, EV21, EV12, EV22 and an outlet valve AV11, AV21, AV12, AV22, wherein, via the inlet valves EV11, EV21, EV12, EV22, pressure can be built up in the corresponding wheel brake RR, FL, FR, RL in each case, and wherein, via the outlet valves AV11, AV21, AV12, AV22, pressure can be dissipated in the corresponding wheel brake RR, FL, FR, RL in each case. For the build-up of pressure in the respective wheel brake RR, FL, FR, RL, the corresponding inlet valve EV11, EV12, EV21, EV22 is opened and the corresponding outlet valve AV11, AV12, AV21, AV22 is closed. For the dissipation of pressure in the respective wheel brake RR, FL, FR, RL, the corresponding inlet valve EV11, EV21, EV12, EV22 is closed and the corresponding outlet valve AV11, AV21, AV12, AV22 is opened.

As can also be seen from FIG. 7, the first wheel brake FR is assigned a first inlet valve EV11 and a first outlet valve AV11, the second wheel brake RL is assigned a second inlet valve EV21 and a second outlet valve AV21, the third wheel brake RR is assigned a third inlet valve EV12 and a third outlet valve AV12, and the fourth wheel brake FL is assigned a fourth inlet valve EV22 and a fourth outlet valve AV22. By means of the inlet valves EV11, EV21, EV12, EV22 and the outlet valves AV11, AV21, AV12, AV22, open-loop and/or closed-loop control processes can be performed in order to implement an ABS function.

Furthermore, the first brake circuit BC1 has a first intake valve HSV1, a first system pressure setting valve USV1, a first expansion tank A1 with a first check valve RSV1, and a first fluid pump PE1. The second brake circuit BC2 has a second intake valve HSV2, a second system pressure setting valve USV2, a second expansion tank A2 with a second check valve RSV2, and a second fluid pump PE2, wherein the first and second fluid pumps PE1, PE2 are driven by a common electric motor M. Furthermore, the hydraulics unit 9 comprises a sensor unit 9.1 for determining the present system pressure or brake pressure. For the brake pressure modulation and to implement an ASR function and/or an ESP function, the hydraulics unit 9 uses the first system pressure setting valve USV1, the first intake valve HSV1 and the first return delivery pump PE1 in the first brake circuit BC1, and the second system pressure setting valve USV2, the second intake valve HSV2 and the second return delivery pump PE2 in the second brake circuit BC2. As can also be seen from FIG. 7, each brake circuit BC1, BC2 is connected to the master brake cylinder 5, which can be actuated by means of a brake pedal 3. Furthermore, a fluid tank 7 is connected to the master brake cylinder 5. The intake valves HSV1, HSV2 permit an intervention into the brake system without the presence of a driver demand. For this purpose, by means of the intake valves HSV1, HSV2, the respective suction path for the corresponding fluid pump PE1, PE2 to the master brake cylinder 5 is opened, such that said fluid pump instead of the driver can provide the pressure required for the closed-loop control. The system pressure setting valves USV1, USV2 are arranged between the master brake cylinder 5 and at least one associated wheel brake RR, FL, FR, RL and set the system pressure or brake pressure in the associated brake circuit BC1, BC2. As can also be seen from FIG. 7, a first system pressure setting valve USV1 sets the system pressure or brake pressure in the first brake circuit BC1 and a second system pressure setting valve USV2 sets the system pressure or brake pressure in the second brake circuit BC2.

As can also be seen from FIG. 7, the bistable solenoid valves 10, 10A may be incorporated into the respective brake circuit BC1, BC2 at various positions P1, P2, P3, P4, P5. In the exemplary embodiments illustrated, the various positions P1, P2, P3, P4, P5 are indicated in each case in the second brake circuit BC2. As can also be seen from FIG. 7, the bistable solenoid valves 10, 10A are incorporated into the respective brake circuit BC1, BC2 in each case at a first position P1 between the corresponding system pressure setting valve USV1, USV2 and the inlet valves EV11, EV12, EV21, EV22 upstream of an outlet channel of the corresponding fluid pump PE1, PE2. Alternatively, the bistable solenoid valves 10, 10A may be incorporated into the respective brake circuit BC1, BC2 in each case at a second position P2 between the master brake cylinder 5 and the corresponding system pressure setting valve USV1, USV2, directly upstream of the corresponding system pressure setting valve USV1, USV2. As a further alternative arrangement, the bistable solenoid valves 10, 10A may be incorporated into the respective brake circuit BC1, BC2 in each case at a third position P3 between the corresponding system pressure setting valve USV1, USV2 and the inlet valves EV11, EV12, EV21, EV22 downstream of the outlet channel of the fluid pump PE1, PE2. Furthermore, in a further alternative arrangement, the bistable solenoid valves 10, 10A may be incorporated into the respective brake circuit BC1, BC2 in each case at a fourth position P4 between the master brake cylinder 5 and the corresponding system pressure setting valve USV1, USV2 in the common fluid branch directly downstream of the master brake cylinder 5. Furthermore, the bistable solenoid valves 10, 10A may be incorporated into the respective brake circuit BC1, BC2 in each case at a fifth position P5 directly upstream of an associated wheel brake RR, FL, FR, RL.

As can also be seen from FIG. 7, in the illustrated exemplary embodiment of the hydraulic brake system 1, an electrical energy store in the form of a vehicle on-board electrical system is used in order to keep the brake pressure which is enclosed in the at least one associated wheel brake RR, FL, FR, RL in the electrically deenergized closed position of the bistable solenoid valve 10, 10A constant by replenishment delivery of brake fluid by means of the fluid pump PE1, PE2. Since electrical energy is required only for the switching of valves and for the brief replenishment delivery function, there is only a small additional electrical energy requirement for the brake pressure maintaining function. Alternatively, in an exemplary embodiment which is not illustrated, hydraulic accumulator devices may be used in order to keep the brake pressure which is enclosed in the at least one associated wheel brake RR, FL, FR, RL in the electrically deenergized closed position of the bistable solenoid valve 10, 10A constant by replenishment delivery of brake fluid. Since electrical energy is required only for the switching of valves, but virtually no electrical energy is required for the replenishment delivery function, there is an even smaller electrical energy requirement for the brake pressure maintaining function owing to the hydraulic accumulator devices.

By means of the described measures, a compensation of any internal leakage and volume expansions which may arise for example owing to temperature changes is possible in an advantageous manner. Furthermore, the described measures may be combined. This means that the hydraulic accumulator device may be combined with the electrical accumulator device in order, in the electrically deenergized closed position of the bistable solenoid valve 10, 10A, to keep the brake pressure enclosed in the at least one associated wheel brake RR, FL, FR, RL constant over a relatively long period of time by replenishment delivery of brake fluid.

As can also be seen from FIGS. 1 to 6, the valve body 15 has a receiving region 19 which at least partially receives the guide assembly 40. The guide assembly may be mounted in rotationally movable or rotationally fixed fashion in the receiving region 19 of the valve body 15. Furthermore, in the exemplary embodiments illustrated, the mechanical detent device 18 is designed as a rotary cam mechanism, which utilizes a circumferential force component in order to vary a rotational position between the valve armature 20 with closing element 34 and the guide assembly 40 and in order to move the valve armature 20 with closing element 34 axially into the detent position and out of said detent position again, such that the valve armature 20, 20A or the plunger 30 with the closing element 34 can switch between the two electrically deenergized positions as a result of application of a switching signal to the solenoid assembly. In the exemplary embodiments illustrated, the guide assembly 40 is mounted rotatably in an undercut 15.4 of the receiving region 19 of the valve body 15 and lies on a support 17. Furthermore, in the exemplary embodiments illustrated, the valve armature 20, 20A is guided rotationally fixedly on an inner wall of the guide sleeve 13.

In the exemplary embodiments illustrated, the guide assembly 40 comprises a control cage 41, which has a first passage opening 41.1 and a first guide geometry 42, and a control ring 44, which has a second passage opening 44.1 and a second guide geometry 45. In the exemplary embodiment illustrated, the control cage 41 and the control ring 44 are each formed as plastics parts and are connected rotationally fixedly to one another. Here, the control ring 44 is inserted into the control cage 41, and positioning lugs formed on the control ring 44 are inserted into corresponding positioning apertures formed on the control cage 41. Furthermore, in an alternative exemplary embodiment which is not illustrated, the control ring 44 may be formed as a punched and bent sheet-metal part. Alternatively, the guide assembly 40 with control cage 41 and control ring 44 may be formed in one piece as a two-component plastics injection-molded part.

In the exemplary embodiments illustrated, the pilot stage armature 21 and the main stage armature 22, 22A of the valve armature 20, 20A are formed in each case as a stepped cylinder with two different outer diameters. Here, a portion of the main stage armature 22, 22A which is guided in the at least one passage opening 41.1, 44.1 of the guide assembly 40 has a third guide geometry 28 which interacts with the first guide geometry 42 of the control cage 40 during an axial movement of the valve armature 20, 20A in the direction of the pole core 11 and which interacts with the second guide geometry 45 of the control ring 44 during an axial movement of the valve armature 20, 20A in the direction of the valve seat 15.1 and which generates a rotational movement of the guide assembly 40 about a common longitudinal axis. The main stage armature 22, 22A is, by means of a portion of the main body 22 arranged outside the guide assembly 40, guided rotationally fixedly on an inner wall of the guide sleeve 13. In an alternative exemplary embodiment which is not illustrated, the third guide geometry 28 may interact with the first guide geometry 42 of the control cage 40 during an axial movement of the valve armature 20, 20A in the direction of the pole core 11 and may interact with the second guide geometry 45 of the control ring 44 during an axial movement of the valve armature 20, 20A in the direction of the valve seat 15.1 and may generate a rotational movement of the valve armature 20, 20A or of the plunger 30 about a common longitudinal axis, whereas the guide assembly 40 is mounted rotationally fixedly in the valve body 15.

The first guide geometry 42 and the second guide geometry may for example each be formed as an encircling slotted guide in which a third guide geometry 28, which is formed as a protruding and rounded positioning element 28.1, can be moved between a detent position and a release position. Alternatively, the positioning element 28.1 may be formed with a polygonal, preferably triangular cross section. The positioning element 28.1 is pressed into a radial bore of the main stage armature 22, 22A. Furthermore, the positioning element 28.1 may be formed in one piece with the main stage armature 22, 22A, such that the pressing-in process can be omitted. The positioning element 28.1 may, via an introduction aperture arranged in the control cage 41, be introduced into the interior of the guide assembly 40 and interact with the slotted guides.

As can also be seen from FIGS. 1 to 6, the main stage armature 22, 22A has, at its end facing toward the valve seat, a plunger receptacle 25 into which an end, facing toward the pole core 11, of the main body 32 of the plunger 30 is rotationally fixedly pressed. Formed at the other end of the main body 32 is the closing element 34, which forms the tip of the plunger 30 and which interacts with the valve seat 15.1 in order to perform the sealing function. The main body 32 of the plunger 30 has a passage opening 36 which is designed for example as a channel or bore and which fluidically connects the two ends of the main body 32 to one another. Here, the pilot stage seat 33 is arranged on that end of the plunger 30 which faces toward the pole core 11. As can be seen in particular from FIG. 2, a first sealing diameter D1 of the valve seat 15.1 is designed to be larger than a second sealing diameter D2 of the pilot stage seat 33. In the exemplary embodiment illustrated, the plunger 30 is designed as a plastics injection-molded part. Alternatively, the plunger 30 may be produced in a PIM, CIM or MIM process or as a 3D-printed part. Furthermore, on the closing element 34, there may be arranged a sealing element which improves the sealing action in the valve seat 15.1. The sealing element may preferably be designed as an O-ring seal. Furthermore, the plunger 30 may be designed as a two-component plastics injection-molded part, wherein the region of the pilot stage seat 33 is composed of a material of relatively high elasticity.

As can also be seen from FIGS. 1 to 6, the main stage armature 22, 22A has, on its end facing toward the pole core 11, a stepped depression 24 in which the stepped pilot stage armature 21 is inserted in axially movable fashion. On an end facing toward the pilot stage seat 33, the pilot stage closing element 27 is formed on the pilot stage armature 21, which pilot stage closing element interacts with the pilot stage seat 33 in order to perform the sealing function. In the exemplary embodiment illustrated, the pilot stage closing element 27 is designed as a ball which is pressed into a corresponding opening of the pilot stage armature 21. At its end facing toward the pole core 11, the pilot stage armature 21 has a spring receptacle 26 which at least partially receives the resetting spring 16. The resetting spring 16 acts between the pilot stage armature 21 and the pole core 11 and is supported at one end on a pole surface, facing toward the valve armature 20, 20A, of the pole core 11 and at the other end on a support in the spring receptacle 26. In an alternative embodiment which is not illustrated, the spring receptacle 26 may also be incorporated in the pole core 11, such that the resetting spring 16 is supported on that end surface of the pilot stage armature 21 which faces toward the pole core 11 and in the spring receptacle 26. An air gap 12 formed between the pole surface of the pole core 11 and a pole surface of the valve armature 20, 20A predefines a maximum possible armature stroke.

As can also be seen from FIGS. 1 to 6, a pressure equalizing groove 23 is formed between the pilot stage armature 21 and the main stage armature 22, 22A, which pressure equalizing groove is, in the exemplary embodiments illustrated, incorporated into the pilot stage armature 21. Alternatively, the pressure equalizing groove 23 may be incorporated into the main stage armature 22, 22A or both into the pilot stage armature 21 and into the main stage armature 22, 22A.

The movement sequence of the valve armature 20 with closing element 34 from the electrically deenergized closed position illustrated in FIG. 1 into the electrically deenergized open position illustrated in FIG. 5 will be described below.

FIG. 1 shows the electrically deenergized closed position of the solenoid valve 10. The resetting spring 16 which is preloaded between pole core 11 and pilot stage armature 21 pushes the pilot stage closing element 27 of the pilot stage into the pilot stage seat 33 and the closing element 34 of the main stage into the valve seat 15.1. The pressure level that prevails in the solenoid valve 10, and thus in the associated wheel brakes RR, FL, FR, RL, at the moment of closing, is maintained. The pressure below the valve seats 33, 15.1 can be dissipated in the direction of the reservoir. For opening, the solenoid assembly, which is not illustrated, of the solenoid valve 10 is electrically energized. The force acting with a seat-closing action on the pilot stage armature 21 is significantly lower than the seat-closing force acting on the main stage armature 22, because the pressure-loaded surface of the pilot stage sealing seat 33 is considerably smaller than the pressure-loaded surface of the valve seat 15.1. The magnetic force thus closes firstly the air gap 12 between pole core 11 and the ferromagnetic pilot stage armature 21. As can also be seen from FIG. 3, the pilot stage seat 33 is now open and, via the pressure equalizing groove 23, realizes pressure equalization between the hydraulics upstream and downstream of the valve seat 15.1. The dimensions of the cylindrical region at the upper end of the pilot stage armature 21 are selected such that the latter remains within the associated depression 24 of the main stage armature 22 even in the case of a maximum relative movement between the main stage armature 22 and the pilot stage armature 21. This results in an increase in the magnetic force. It may be expedient to magnetically insulate the slim cylindrical region of the pilot stage armature 21 from the main stage armature 22, for example by means of a coating or an additional component.

Figure 4:
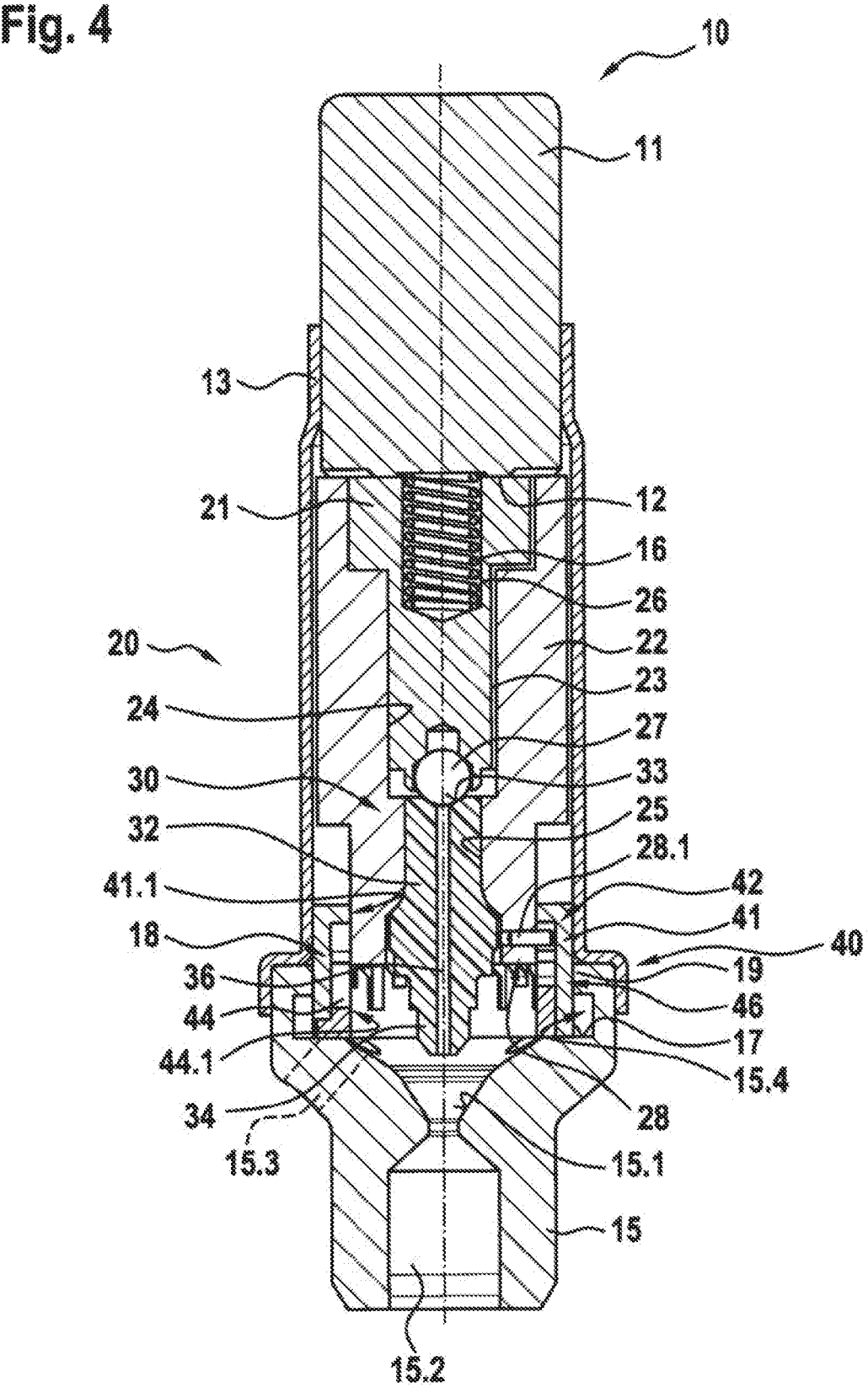
FIG. 4 is a schematic perspective sectional illustration of the solenoid valve from FIG. 1 in the electrically energized state with open valve seat.

FIG. 4 furthermore shows the electrically energized situation of the solenoid valve 10. After pressure equalization has occurred, the air gap 12 between the ferromagnetic components of pole core 11 and main stage armature 22 has closed. The valve armature 20 is now at its maximum axial stroke. During the axial movement in the direction of the pole core 11, the main stage armature 22 has rotated the guide assembly 40 through a predefined angle by way of the third guide geometry 28 and the first guide geometry 42 of the control cage 41.

Figure 5:
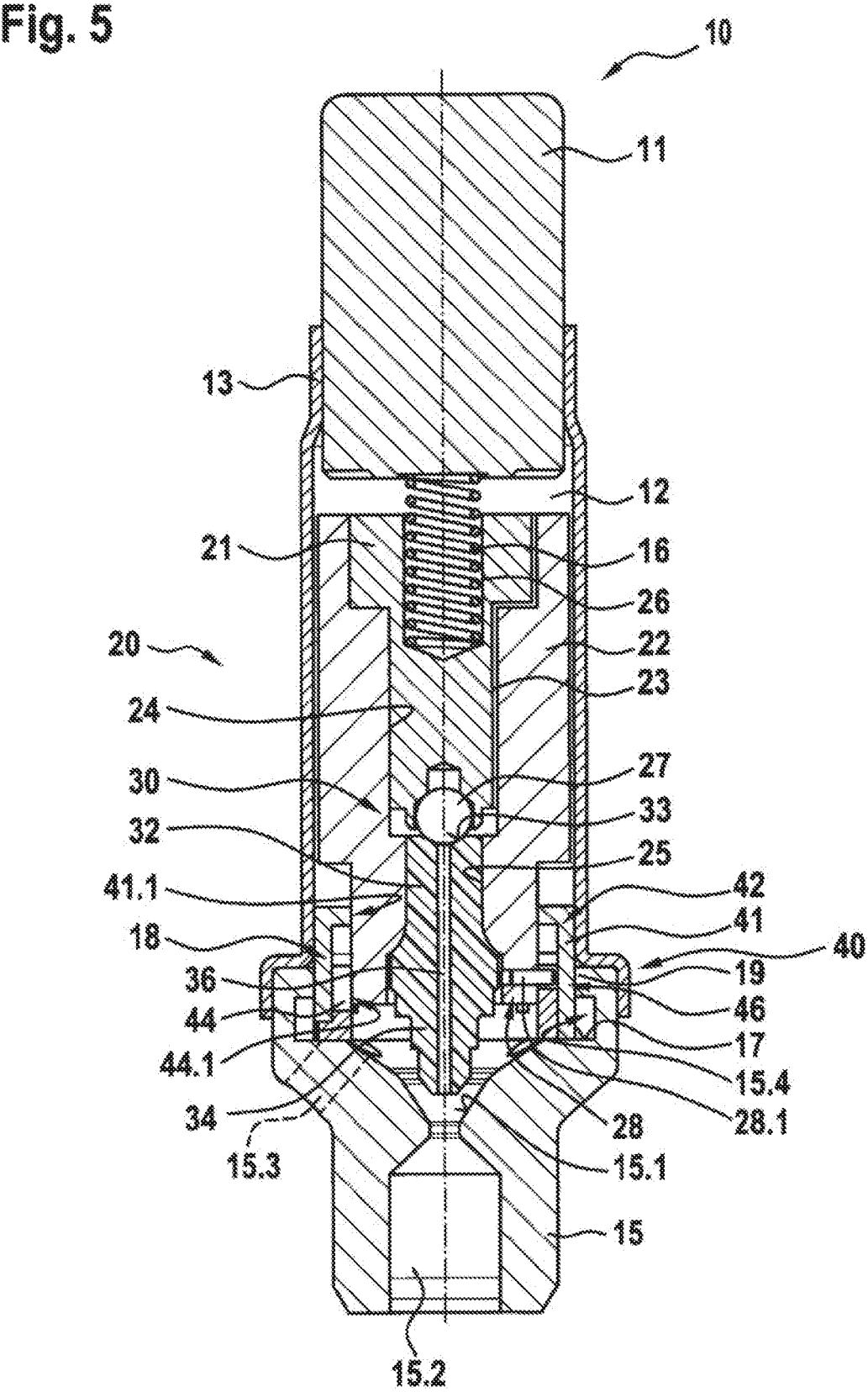
FIG. 5 is a schematic perspective sectional illustration of the solenoid valve from FIG. 1 in its electrically deenergized open position.

FIG. 5 illustrates the electrically deenergized open position of the solenoid valve 10. The resetting spring 16 has pushed the pilot stage armature 21 into its seat in the main stage armature 22. The main stage armature 22 has, by means of the control mechanism for bistable characteristics of the detent device 18, assumed its detent position for the electrically deenergized open position. This means that, during the axial movement in the direction of the valve seat 15.1, the main stage armature 22 has rotated the guide assembly 40 through a predefined angle into the detent position by way of the third guide geometry 28 and the second guide geometry 46 of the control ring 44. In the detent position, the main stage armature 22 is supported axially by way of the guide assembly 40, and the closing element 34 opens up the valve seat. From this electrically deenergized open position, at the moment of electrical energization during the next switching process, the main stage armature 22 and the pilot stage armature 21 will move jointly to the pole core stop, because the solenoid valve 10 is pressure-balanced and there are no hydraulically closing forces. Here, the described principle whereby the guide assembly 40, controlled by the control mechanism for bistable characteristics, rotates through a predefined angle during every axial movement of the main stage armature 22 is repeated, such that the electrically deenergized closed position illustrated in FIG. 1 is subsequently set.

Figure 6:
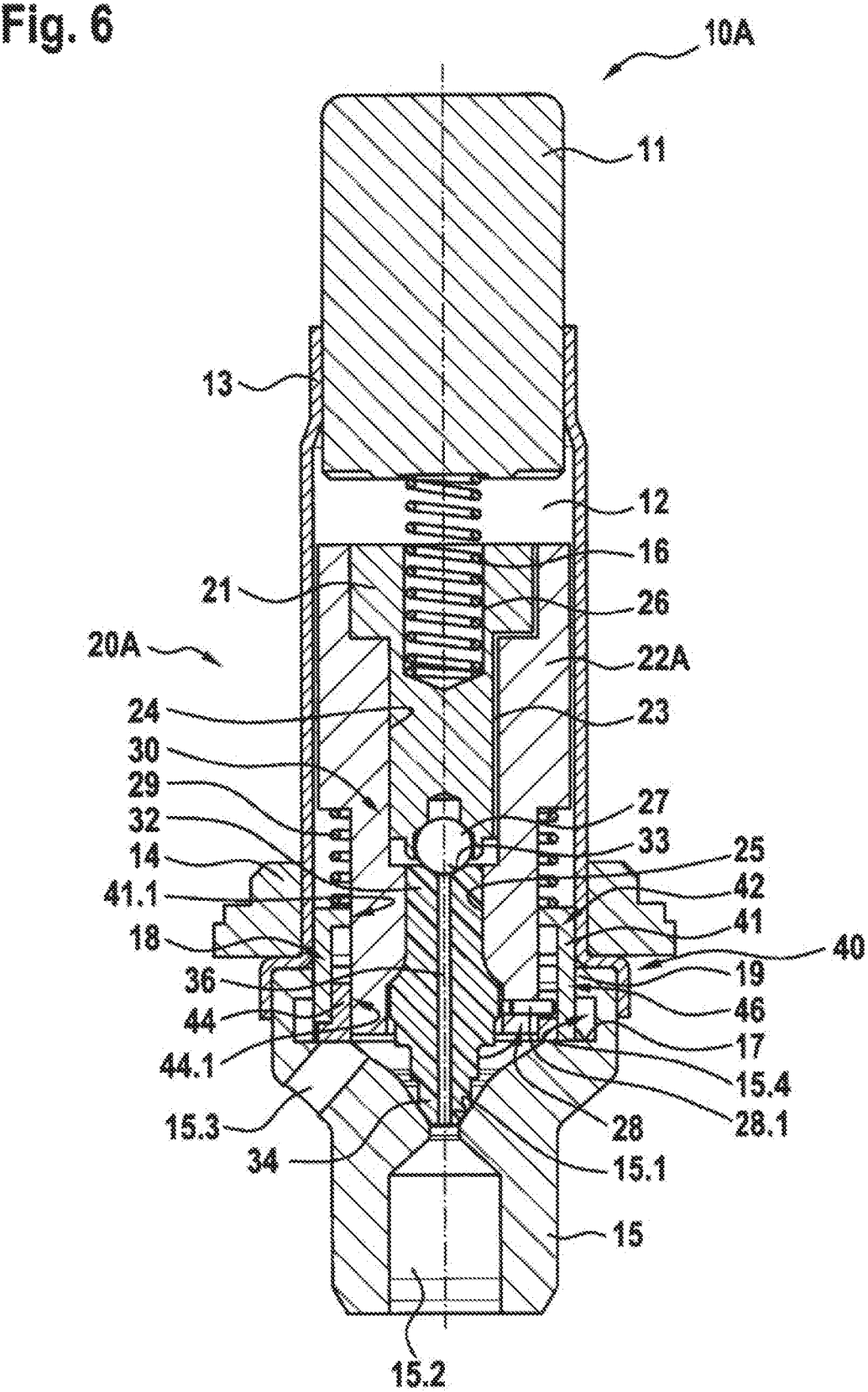
FIG. 6 is a schematic perspective sectional illustration of a further exemplary embodiment of a solenoid valve according to the disclosure in its electrically deenergized closed position.

FIG. 6 illustrates an alternative exemplary embodiment of the solenoid valve 10A. As can also be seen from FIG. 6, the illustrated solenoid valve 10A has, by contrast to the solenoid valve 10, a main stage spring 29, which moves the main stage armature 22A in the direction of the pole core 11. Here, the spring force of the main stage spring 29 is selected to be lower than the spring force of the resetting spring 16. The main stage spring 29 that is additionally used here under the main stage armature 22A acts counter to the resetting spring 16. The main stage armature spring 22A raises the main stage armature 22A in the electrically energized situation illustrated in FIG. 3 when the pilot stage armature 21 has already been opened and thus pressure equalization has been established. The air gap 12 between main stage armature 22A and pole core 11, and thus also the required magnetic force, are thus reduced.

In the solution described above, it is possible without functional disadvantage for both the guide assembly 40 and the valve armature 20, 20A, or both of these, to rotate depending on where less friction has to be overcome. In order to targetedly permit only the movement of one assembly, it is possible either for the guide assembly 40 to be fastened fixedly rather than rotationally movably in the valve body 15, or for a rotation prevention facility to be provided for the valve armature 20, 20A. Such a rotation prevention facility may be implemented for example by means of positive locking of the valve armature 20, 20A with the guide sleeve 13 or with the pole core 11.

The invention claimed is:

1. A solenoid valve for a hydraulic brake system, comprising:

a solenoid assembly;

a pole core;

a guide sleeve connected to the pole core;

a valve armature which is guided in axially movable fashion within the guide sleeve and which is configured to be driven counter to a spring force of a resetting spring by a magnet force generated by the solenoid assembly or is configured to be driven by the spring force of the resetting spring, the valve armature configured to axially move a plunger with a closing element;

a valve body connected to the guide sleeve, the valve body having a valve seat arranged between at least one first flow opening and at least one second flow opening;

a guide assembly defining at least one passage in which one of the valve armature and the plunger is guided axially; and a mechanical detent device arranged between the guide assembly and the one of the valve armature and the plunger, the mechanical detent device, in an electrically deenergized closed position of the solenoid valve, releases the one of the valve armature and the plunger such that the resetting spring drives the valve armature and pushes the closing element sealingly into the valve seat in order to perform a sealing function, and, in an electrically deenergized open position of the solenoid valve, the mechanical detent device fixes the one of the valve armature and the plunger, counter to the spring force of the resetting spring, in an axial detent position at which the closing element is lifted off from the valve seat, wherein the valve armature comprises a main stage armature with a first pressure-loaded surface and a pilot stage armature with a smaller second pressure-loaded surface, the pilot stage armature being mounted in axially movable fashion in the main stage armature and interacting via a pilot stage closing element with a pilot stage seat.

2. The solenoid valve as claimed in claim 1, wherein:

the valve body has a receiving region which at least partially receives the guide assembly, and the guide assembly is mounted in rotationally movable or rotationally fixed fashion in the receiving region of the valve body.

3. The solenoid valve as claimed in claim 1, wherein:

the mechanical detent device is configured as a rotary cam mechanism having a circumferential force component that varies a rotational position between the one of the valve armature and the plunger with the closing element and the guide assembly, and the solenoid assembly is configured such that application of a switching signal to the solenoid assembly moves the one of the valve armature and the plunger with the closing element axially into the axial detent position and out of said axial detent position again, such that the one of the valve armature and the plunger with the closing element switches between the two electrically deenergized positions.

4. The solenoid valve as claimed in claim 1, wherein the resetting spring acts between the pilot stage armature and the pole core.

5. The solenoid valve as claimed in claim 1, wherein:
a main stage spring moves the main stage armature in a direction toward the pole core, and
a main stage spring force of the main stage spring is lower than the spring force of the resetting spring.

6. The solenoid valve as claimed in claim 1, wherein:
a main body of the plunger has a passage opening which fluidically connects first and second ends of the main body to one another, and
the pilot stage seat is arranged at the first end, which faces toward the pole core, and the closing element is arranged at the second end, which faces toward the valve seat.

7. The solenoid valve as claimed in claim 6, wherein:
the plunger is configured as a two-component plastics injection-molded part having a first portion and a second portion, and
the first portion of the plunger, on which the pilot stage seat is located, comprises a material with higher elasticity than the second portion of the plunger.

8. The solenoid valve as claimed in claim 1, wherein a first sealing diameter of the valve seat is greater than a second sealing diameter of the pilot stage seat.

9. The solenoid valve as claimed in claim 1, wherein a pressure equalizing groove is formed between the pilot stage armature and the main stage armature.

10. The solenoid valve as claimed in claim 1, wherein the pilot stage armature is guided in a depression of the main stage armature irrespective of the armature stroke.

11. The solenoid valve as claimed in claim 1, wherein the pilot stage armature is magnetically insulated from the main stage armature.

12. The solenoid valve as claimed in claim 1, wherein the guide assembly has a control cage, which defines a first passage opening of the at least one passage opening and a first guide geometry, and a control ring, which defines a second passage opening of the at least one passage opening and a second guide geometry.

13. The solenoid valve as claimed in claim 12, wherein that one of the valve armature and the plunger has, on a portion which is guided in the at least one passage opening of the guide assembly, a third guide geometry which interacts with the first guide geometry of the control cage during an axial movement of the valve armature in a direction toward the pole core and which interacts with the second guide geometry of the control ring during an axial movement of the valve armature in a direction toward the valve seat, the third guide geometry generating a rotational movement of the one of the valve armature and the plunger and/or of the guide assembly about a common longitudinal axis.

14. A hydraulic brake system for a vehicle, having
a master brake cylinder;
a hydraulics unit; and
multiple wheel brakes;
wherein the hydraulics unit comprises at least two brake circuits for brake pressure modulation in the wheel brakes,
wherein the at least two brake circuits each have at least one bistable solenoid valve comprising:
a solenoid assembly;
a pole core;
a guide sleeve connected to the pole core;
a valve armature which is guided in axially movable fashion within the guide sleeve and which is configured to be driven counter to a spring force of a resetting spring by a magnet force generated by the solenoid assembly or is configured to be driven by the spring force of the resetting spring, the valve armature configured to axially move a plunger with a closing element;
a valve body connected to the guide sleeve, the valve body having a valve seat arranged between at least one first flow opening and at least one second flow opening,
a guide assembly defining at least passage in which one of the valve armature and the plunger is guided axially; and
a mechanical detent device arranged between the guide assembly and the one of the valve armature and the plunger, the mechanical detent device, in an electrically deenergized closed position of the solenoid valve, releases the one of the valve armature and the plunger such that the resetting spring drives the valve armature and pushes the closing element sealingly into the valve seat in order to perform a sealing function, and, in an electrically deenergized open position of the solenoid valve, the mechanical detent device fixes the one of the valve armature and the plunger, counter to the spring force of the resetting spring, in an axial detent position at which the closing element is lifted off from the valve seat,
wherein the valve armature comprises a main stage armature with a first pressure-loaded surface and a pilot stage armature with a smaller second pressure-loaded surface, the pilot stage armature being mounted in axially movable fashion in the main stage armature and interacting via a pilot stage closing element with a pilot stage seat, and
wherein, in the electrically deenergized open position, the solenoid valve enables the brake pressure modulation in at least one associated wheel brake and, in the electrically deenergized closed position, the solenoid valve encloses a present brake pressure in the at least one associated wheel brake.

\* \* \* \* \*